United States Patent [19]

Lincoln

[11] 4,135,778
[45] Jan. 23, 1979

[54] MICROSCOPE LENS SYSTEM

[75] Inventor: F. William Lincoln, Cohasset, Mass.

[73] Assignee: Lincoln Associates, Inc., Cohasset, Mass.

[21] Appl. No.: 750,856

[22] Filed: Dec. 15, 1976

[51] Int. Cl.² ............................................. G02B 7/14
[52] U.S. Cl. ..................................... 350/38; 350/9; 350/183; 350/257; 353/39
[58] Field of Search ................ 350/37, 38, 39, 183, 350/175 E, 9, 18, 19, 257; 353/39

[56] References Cited

U.S. PATENT DOCUMENTS

| 1,553,211 | 9/1925 | Barr et al. | 350/183 |
| 3,186,296 | 6/1965 | Erban | 350/9 |
| 3,743,377 | 7/1973 | Rosenberger | 350/37 |
| 3,971,621 | 7/1976 | Albrecht-Buehler | 350/87 |

Primary Examiner—John K. Corbin
Assistant Examiner—Matthew W. Koren
Attorney, Agent, or Firm—Kenway & Jenney

[57] ABSTRACT

A microscope lens system is provided which facilitates rapid, convenient, and accurate substitution of one eyepiece lens for another. The microscope tube is provided with an opening and an internal receptacle communicating with that opening at the location where an eyepiece is to be supported. Each eyepiece lens unit comprises an actual eyepiece lens mounted in a clip member that encircles the lens and that meets with the receptacle to securely and precisely retain the eyepiece lens at the appropriate position along the optical axis of the microscope. A light shield, preferably integral with the remainder of the eyepiece lens unit, masks the opening in the tube when the eyepiece lens is in place within the tube.

7 Claims, 3 Drawing Figures

MICROSCOPE LENS SYSTEM

BACKGROUND OF THE INVENTION

The present invention relates to an improved microscope arrangement that facilitates the rapid and accurate change of magnification of the microscope.

Naturally, movable lens arrangements for microscopes have been known for quite some time. The most typical provisions are (a) a number of objective lens mounted on a turret such that any desired objective lens can be swung into the optical path of the microscope and (b) an eyepiece lens that is movable (e.g., with a rack and pinion arrangement) along the optical axis of the microscope to achieve proper focus. Movable, and removable, lens have been used in many other types of optical systems as well.

Despite the variety of lens systems proposed for various problems and circumstances, there has remained the need for a lens system in which it is possible for an inexperienced microscope operator to rapidly, conveniently, and without substantial manual adjustment, change the magnification of the microscope as required for examining different types of items.

In view of this, it is a principal object of the present invention to provide an improved microscope lens system that facilitates the rapid, convenient, and accurate change of magnification of a microscope system.

SUMMARY OF THE INVENTION

Briefly, the invention features a microscope including a tube having an optical axis, an objective lens system and supporting means for that system, and an eyepiece lens subunit. The eyepiece lens subunit comprises an actual eyepiece lens and a clip member of predetermined cross section that grips the eyepiece lens at the periphery thereof. An opening in the tube is provided for receiving the eyepiece lens for insertion of the clip member into a receptacle within the tube adjacent that opening, the receptacle being sized to receive the clip member. Light shield means preferably integral with the remainder of the eyepiece lens subunit, are provided adjacent the opening in the tube to prevent the entrance of stray light into the microscope tube during its use.

BRIEF DESCRIPTION OF THE DRAWINGS

Other objects, features, and advantages of the invention will become apparent from the description below, taken in conjunction with the attached drawings in which.

DETAILED DESCRIPTION OF A PARTICULAR PREFERRED EMBODIMENT

Figure 1:
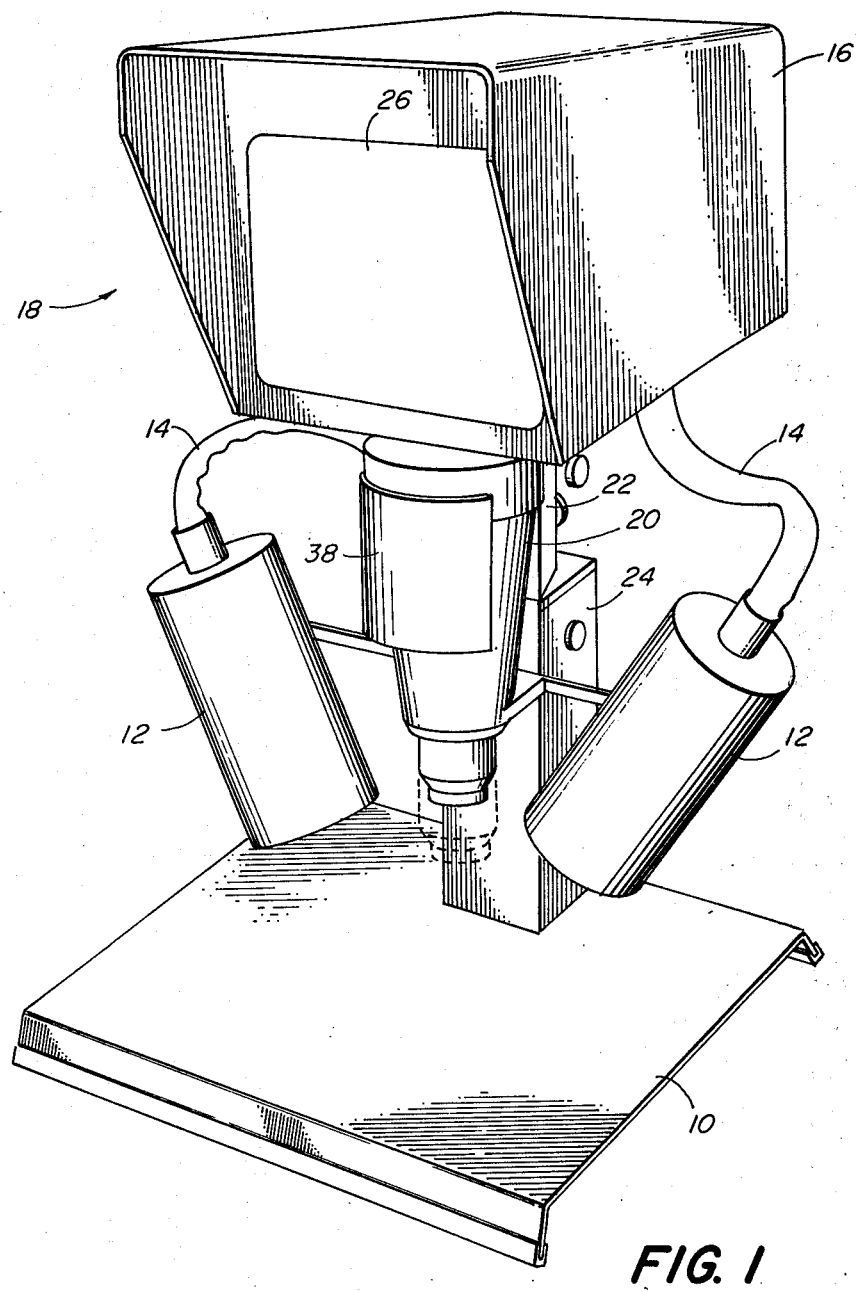
FIG. 1 is a perspective view of a microscope viewer apparatus incorporating features of the present invention.

Referring first to FIG. 1, the apparatus includes a stage 10 upon which an object to be magnified is placed for illumination by a pair of light sources 12 that, in turn, receive light via bundles 14 of fiber optics from a bulb (not shown) supported within a housing 16 of the viewer portion 18 of the microscope viewer. As will be understood by those skilled in the art, where it is desirable to view an object by transmitted, rather than reflected, light, a transparent or translucent stage 10 may be provided and a light source provided below it.

The viewer portion 18 of the apparatus is mounted atop a tapered tube 20 that forms the body of the microscope portion. The body 20, in turn, is supported by bracket 22 secured to a rigid support column 24 that is connected to the base 10.

In addition to the bulb mentioned above, the associated power lines and any necessary circuitry (e.g., switches), the housing 16 includes a conventional set of reflecting surfaces for transmitting light received from the microscope portion of the apparatus to the rear surface of a fresnel screen 26 for convenient viewing of the user of the apparatus. As will be understood by those skilled in the art, this viewing arrangement is highly desirable in various circumstances, including the convenient and rapid visual inspection of various manufactured items (e.g., printed circuits). Furthermore, in many such use situations the individual that will be using the apparatus may not be skilled in the operation and adjustment of conventional microscopes. Thus, the features of the present invention relating to the microscope segment of the apparatus, discussed immediately below, are of special value in such circumstances.

Figures 2, 3:
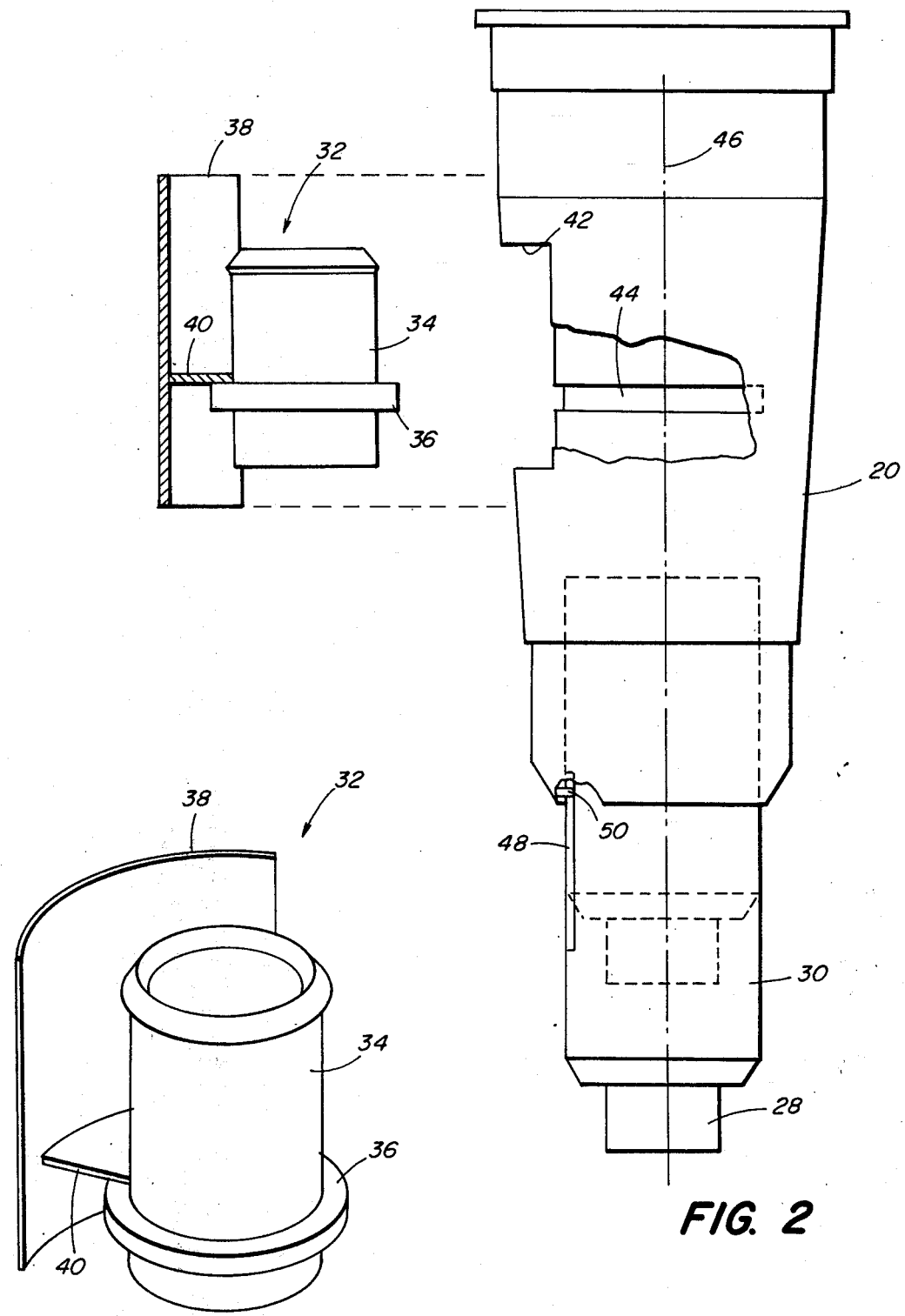
FIG. 2 is a partially broken-away side elevation of the microscope portion of the apparatus of FIG. 1.
FIG. 3 is a perspective view of a removable eyepiece lens subunit of the microscope portion illustrated in FIG. 2.

Referring now to FIGS. 2 and 3, it will be seen that the microscope segment of the unit comprises the tube 20, an objective lens 28 supported in a body 30 that is slidably supported in the tube 20, and an eyepiece lens unit 32. The eyepiece lens unit includes the actual eyepiece lens 34, a ringshaped clip member 36 that snugly grips the lens 34 around the periphery thereof with sufficient force to prevent sliding movement of the lens 34 with respect to the ring 36, and a light shield 38 secured to the ring 36 by a bracket 40. The light shield 38 is curved to substantially match the curvature of (i.e., be congruent to) the tube 20.

The tube 20 includes an opening 42 in its front face sized to permit the eyepiece lens 34 and the ring 36 to pass therethrough. The light shield 38 is larger than the opening 42 and extends in each direction to overlap the wall of tube 20 to prevent stray light from entering the tube 20 when an eyepiece unit is in place on the tube, as further described below.

A receptacle within tube 20 for the ring 36 of the eyepiece unit 32 is provided in the form of a groove 44 in the interior surface of the wall of tube 20, the groove 44 communicating with the opening 42 to permit access to the groove. The groove 44 and clip member 36 are sized and shaped to permit the member 36 to be rapidly, but snugly, received in the groove 44 for retaining the eyepiece lens 34 in position along the optical axis 46 of the tube 20 and for maintaining the light shield 38 in place covering the opening 42.

From the above description, it will be evident that the construction of eyepiece lens unit 32 and the tube 20 permits the rapid, convenient, and accurate positioning of an eyepiece lens 34 within the tube even by relatively unskilled workers. Furthermore, this arrangement facilitates the rapid and convenient substitution of one eyepiece lens for another in the microscope subunit of the apparatus in order to change magnification as is desired. As will be understood by those skilled in the art, a number of eyepiece lens units 32 can be provided, each with an eyepiece lens 34 of different focal length and, each eyepiece lens supported by its ring 36 in such a position as to be properly positioned for accurate focus when the ring 36 is received in the groove 44. A change of magnification by the user of the instrument, therefore, merely requires that one eyepiece lens unit 32 be removed and another inserted into the tube 20, as opposed to the more conventional type of lens system adjustments (e.g., a single eyepiece lens that is moved with a rack and pinion arrangement along with optical axis). The resulting convenience and accuracy, especially for high rate examinations of items on a production line and where such inspection is done by workers relatively unskilled with microscope operation, is evident.

In one preferred embodiment, the objective lens 28 is chosen to be a symmetrical erector lens (e.g., 100 millimeters focal length) to permit a constant working distance when coupled with the eyepiece lens. Since a symmetrical lens may be focused in two planes, the magnification of the system with a given eyepiece lens 34 may be reduced by approximately half by shifting the symmetrical lens 28 from the first to the second plane in which focus is proper.

To achieve this inexpensive and convenient adjustment feature, the body 30 that supports the lens 28 is provided with a slot 48 that receives a stud 50 projecting from an internal surface of the tube 20. The longitudinal ends of the slot 48 define stop positions in the sliding movement of the body 30 relative to the tube 20. Thus, by an appropriate length and placement of the slot 48 relative to the lens 28, those stop positions can define the two symmetrical planes in which focus of the lens 28 is proper.

Microscope viewers constructed in accordance with the above description have been found to be very successful in facilitating the rapid inspection of items. With an eyepiece lens unit in place, a magnified, full color, erect and positive image is formed. The fresnel screen creates a bright image which can easily be seen in a well lit room and a series of five interchangable eyepiece lens units 32 can be employed to provide a range of magnifications (e.g., from five times to sixty times actual size).

While a particular preferred embodiment of the present invention has been illustrated in the accompanying drawings and described in detail herein, other embodiments are within the scope of the invention and the following claims.

What is claimed is:
1. A microscope including
a tube having an optical axis;
objective lens means;
means for supporting said objective lens means at said optical axis of said tube;
eyepiece lens means;
an opening in the wall of said tube accessible from the exterior of the microscope for receiving said eyepiece lens means; and
means for supporting said eyepiece lens means at said optical axis spaced apart therealong from said objective lens means comprising
a clip member of predetermined cross section gripping said eyepiece lens means at the periphery thereof and
a receptacle within said tube adjacent said opening sized to receive said clip member and to retain said clip member at a fixed longitudinal location in said tube; and
light shield means supportable adjacent said opening in said tube wall
whereby said eyepiece lens means rapidly and accurately placeable in, and removable from, said tube.

2. The microscope of claim 1 wherein said light shield means are rigidly secured to said clip member, whereby said eyepiece lens means, said clip member, and said light shield means form a conveniently removable subunit of said microscope.

3. The microscope of claim 2 wherein said clip member is in the form of a ring extending around the entire periphery of said eyepiece lens means.

4. The microscope of claim 2 wherein said light shield means comprise a plate having a curvature substantially congruent to that of said tube and a size such that it extends beyond said tube wall opening in each direction when said clip member is received in said receptacle.

5. The microscope of claim 1 wherein said receptacle comprises a groove provided in the interior surface of said tube, said groove communicating with said tube wall opening.

6. The microscope of claim 5 wherein said clip member comprises a ring encircling said eyepiece lens means and wherein said light shield means is secured to said ring.

7. The microscope of claim 1 wherein said means for supporting said objective lens means comprise a body engaging said objective lens means and supported on said tube coaxially therewith for sliding movement with respect to said tube between the first and second positions, said objective lens means comprising symmetrical erector lens means that are positioned in one of their two symmetrical planes of proper focus when said supporting body is in each of said first and second positions.

* * * * *